United States Patent

[11] 3,564,250

[72] Inventors Paul B. Price;
Robert M. Walker, St. Louis, Mo.; Robert L. Fleischer, Schenectady, N.Y.
[21] Appl. No. 606,547
[22] Filed Jan. 3, 1967
[45] Patented Feb. 16, 1971
[73] Assignee General Electric Company
a corporation of New York

[54] METHOD OF MEASURING FAST NEUTRONS BY OBSERVING MULTIPRONGED TRACKS OF CHARGED PARTICLES FORMED IN CELLULOSE NITRATE
5 Claims, No Drawings

[52] U.S. Cl. .................................................... 250/83.1, 250/83
[51] Int. Cl. .................................................... G01t 5/10
[50] Field of Search .................................. 250/83, CD, 83.1

[56] References Cited
UNITED STATES PATENTS
3,418,472  12/1968  Evans .......................... 250/83.1

Primary Examiner—Archie R. Borchelt
Attorneys—Richard R. Brainard, Paul A. Frank, Charles T. Watts, Frank L. Neuhauser, Oscar B. Waddell and Melvin M. Goldenberg

ABSTRACT: This specification discloses the concept of detecting fast neutrons by chemically drilling or etching out multipronged tracks of charged particles formed in cellulose nitrate test bodies by collisions of fast neutrons with nuclei including those of carbon, nitrogen, oxygen and boron.

METHOD OF MEASURING FAST NEUTRONS BY OBSERVING MULTIPRONGED TRACKS OF CHARGED PARTICLES FORMED IN CELLULOSE NITRATE

The present invention relates generally to the measuring and testing art and is more particularly concerned with a new method of detecting and monitoring fast neutrons in several energy intervals up to about 50 Mev.

The rapid advance of radiation science and technology has resulted in an increasing demand for means for monitoring, detecting or measuring fast neutron radiation in the presence of a background of ionizing radiation. Desirably, such means would additionally avoid the processing complexity of the emulsion technique and would also be free from the relatively short storage time limitation of emulsion detectors.

On the basis of our discovery subsequently to be described, these shortcomings of the emulsion technique for monitoring of fast neutron radiation can now for the first time be avoided. Moreover, this result can be obtained through the use of inexpensive materials, the form of which may be selected to meet virtually any requirement of packaging, processing or use. Further, by virtue of the sensitivity of this means, the ease with which it can be employed and its ability to identify fast neutrons in the presence of $\beta$, $\gamma$, X rays and other ionizing radiation opens the practical possibility of fast neutron radiography of very thick materials. It also simplifies the certain detection of nuclear explosions.

This invention is predicated upon our discovery that in certain materials such as cellulose nitrate, fast neutrons will react with certain elements to produce charged particle trails which can be selectively etched and removed from the surface portions of a cellulose nitrate body so that the resulting recesses can be observed with the aid of an optical microscope. Thus, a sheet of cellulose nitrate which has been exposed to fast neutrons can be subjected to the irradiation-etching process disclosed and claimed in U.S. Pat. No. 3,303,085. The resulting recessed article then constitutes the "developed" negative of the radiation "photograph" of a number of collisions of fast neutrons with nuclei of oxygen, nitrogen and carbon atoms in the cellulose nitrate sheet.

We have further found that some of the fast neutrons result in two-, three-, or four-pronged collision-generated charged particle tracks, depending upon the specific nucleus and depending also upon the energy of the colliding fast neutron. Thus, in a given test sheet of cellulose nitrate, two-, three-, or four-pronged collision events can be observed following the development of the irradiated sheet by the aforesaid etching technique, the tracks of the alpha and other charged particles being made visible at a magnification of 200 diameters and the tracks in each instance indicating a clear focus to the particular collision point. Preferably, the etching operation is carried out for a long enough time to bring each recess of a multipronged set into communication with each other at each focal point marking the site of a fast neutron-atom nucleus collision.

In broad, general terms the method of this invention comprises the steps of exposing a body of suitable material to a source of fast neutrons and causing nuclear breakup collisions of fast neutrons with certain nuclei and consequent formation of multipronged charged-particle damage tracks in the body, and then selectively dissolving and removing damage track-defining material from the body to produce recesses in the body surface. As a final step, when the purpose is to measure fast neutron radiation, the number of multipronged recesses formed in the body by the dissolving and removing operation is determined, suitably by optical inspection and counting. This number can then be used as a basis for determining the number of fast neutrons penetrating the body during the exposure of the body to the source of radiation to be so tested. Thus, multipronged damage tracks and the resulting recesses are characteristic signs of the presence of fast neutrons in the radiation to which the body has been exposed, other sources of radiation such as thermal neutrons not being involved in or producing multipronged damage tracks in the test body.

As indicated above, cellulose nitrate is preferred for purposes of this invention as the test material. This is in part because charged particles such as alpha particles will readily form selectively etchable tracks in cellulose nitrate and in part because cellulose nitrate provides an abundance of nuclei which will produce such charged particles upon collision by fast neutrons. In accordance with this invention, cellulose acetate-butyrate may alternatively be used for these same reasons. These materials may be obtained on the market in the form of sheets or strips and in other forms suiting the preference of the operator. Preferably, however, sheet or strip material of this kind should be at least about two mils thickness so that the surface exposed to the fast neutron source does not tend to be bombarded by fission fragments or other particles from nuclear reactions of a fissionable material source on the side of the strip facing away from the fast neutron source. Also, this preference for thickness is based upon the fact that for purposes of this invention, it is not necessary nor ordinarily desirable to produce holes running all the way through the test sheet or strip material.

The chemical drilling operation may be carried out with any desired medium and in general suitable media will be those which are recognized as etchants for the particular material of the test article. Thus, in the case of both cellulose nitrate and cellulose acetate-butyrate, we employ an aqueous caustic soda solution, specifically 6N NaOH, and we immerse the test piece in the etchant solution. In the case of cellulose nitrate, the etchant solution is at room temperature for 2—5 hours, while in the case of cellulose acetate-butyrate, it is preferably at 60° C. for 5—15 minutes. The test piece will be removed from the etchant solution at the end of that time and water-rinsed to remove the adhering etchant solution.

Charged particles other than alpha particles produced in accordance with this invention method and used to form damage tracks selectively removable by an etching operation to provide visible bores in the test specimen include lithium, deuterium and tritium particles. The particular particles produced and the number of prongs formed as a consequence of each fast neutron-nucleus reaction will depend upon the energy level of the fast neutron and the kind of nucleus involved. This is illustrated in the following table:

0001

TABLE I

| Reaction | Q(mev.) | $E_n$(mev.) | $\sigma(10^{-24}$cm.$^2)$ | Shape |
| --- | --- | --- | --- | --- |
| (1) $C^{12}(n,n')3\alpha$ | −7.28 | 12.6 | 0.2 | 3-pronged. |
|  | −7.28 | 14 | 0.25 | Do. |
|  | −7.28 | 17 | 0.31 | Do. |
|  | −7.28 | 20 | 0.29 | Do. |
| (2) $N^{14}(n,\alpha)B^{11}$ | −0.2 | 14 | 0.1 | 2-pronged. |
|  | −0.2 | 1.8 | 0.15 | Do. |
| (2) $N^{14}(n,2\alpha)Li^7$ | ? | 14 | 0.015 | 3-pronged. |
| (3) $O^{16}(n,\alpha)C^{13}$ | −2.2 | 14 | 0.3 | 2-pronged. |
|  | −2.2 | 5 | 0.18 | Do. |
|  | −2.2 | 4 | 0.12 | Do. |
| (4) $O^{16}(n,n'4\alpha)$ | −14.43 | (¹) | ? | 4-pronged. |

¹ Up to 45.

As table I indicates, boron may be used in accordance with this invention suitably being incorporated in a cellulose nitrate or cellulose acetate-butyrate test sheet by any desired doping procedure or technique known in the art. Thus, boron nuclei in addition to carbon, nitrogen and oxygen nuclei may participate in the fast neutron reactions ultimately resulting in accordance with this invention in multipronged, visible recesses in the test body. The following illustrative, but not limiting, examples of the present invention as it has actually been carried out are offered to further describe the invention to the full understanding of those skilled in the art:

EXAMPLE I

A 10-mil thick sheet of cellulose nitrate was exposed in an accelerator to 14 Mev. neutrons produced in the accelerator at $10^9/cm.^2$ by bombarding a tritiated zirconium foil. Upon removal of this test sheet from the accelerator, it was immersed in a 6N NaOH solution at room temperature and maintained therein for 3 hours. Then on removal, the sheet was water-rinsed and air dried and then examined under a microscope at 200 diameters magnification. Multipronged recesses were readily seen and a count was taken which established that $10^4$ per $cm.^2$ three-pronged carbon breakup events had occurred during the fast neutron exposure period and that approximately the same number of two-pronged events also occurred. No four-pronged recesses were seen, the energy level of the fast neutrons being too low, as confirmed by table I.

EXAMPLE II

In another similar test operation to that of example I, a 10-mil thick sheet of cellulose acetate-butyrate containing 1.5 percent boron in the form of boron oxide was exposed to fast neutrons in an accelerator as described in example I. The exposure period was 10 minutes, as in example I, and the test sheet was maintained at a temperature below about 60° C. during this time as also was the example I case. Chemical drilling of the charge particle damage tracks was done as described above using a 6N NaOH solution at 60° C. for an immersion time of 15 minutes. Again, examination under the microscope revealed $10^4$ per cm.2 two-pronged events and about the same number of three-pronged recesses.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the specifically described embodiments of the invention may be made without departing from the scope of the invention as set forth in what is claimed.

We claim:

1. The method of measuring fast neutron radiation which comprises the steps of exposing a body of material selected from the group consisting of cellulose nitrate and cellulose acetate-butyrate to a source of fast neutrons and thereby causing nuclei breakup collisions of fast neutrons with carbon, nitrogen and oxygen nuclei and formation of charged particles producing multipronged damage tracks in the body, selectively dissolving and removing damage track-defining material from the body and thereby producing multipronged recesses in the body, and counting the resulting multipronged recesses in said body.

2. The method as described in claim 1 in which the body is in the form of a sheet at least 2-mils thick and in which the selective dissolving and operation is carried out by contacting the fast neutron-irradiated sheet with an aqueous caustic soda solution.

3. The method as described in claim 1 in which the body is a sheet of cellulose nitrate and the selective dissolving and removing operation is carried out by immersing the cellulose nitrate sheet in a 6N solution of caustic soda at about room temperature.

4. The method as described in claim 1 in which the body is of cellulose acetate-butyrate and the selective dissolving and removing operation is carried out by immersing the said body in a dilute aqueous caustic soda solution at about 60° C.

5. The method as described in claim 1 in which the body contains boron nuclei and charged particles are formed by nuclei breakup collisions of fast neutrons with boron nuclei.